(12) United States Patent
Morin et al.

(10) Patent No.: US 9,003,520 B2
(45) Date of Patent: Apr. 7, 2015

(54) SECURING A STORAGE ELEMENT FOR A BINARY DATUM, CONTROL REGISTER AND CHIP CARD

(75) Inventors: Nicolas Morin, Talence (FR);
Thiebeauld De La Croue Hugues, Pessac (FR)

(73) Assignee: Oberthur Technologies, Levallois Perret (FR)

( * ) Notice: Subject to any disclaimer, the term of this patent is extended or adjusted under 35 U.S.C. 154(b) by 425 days.

(21) Appl. No.: 13/218,392

(22) Filed: Aug. 25, 2011

(65) Prior Publication Data
US 2012/0054863 A1 Mar. 1, 2012

(30) Foreign Application Priority Data

Aug. 25, 2010 (FR) ...................................... 10 56759

(51) Int. Cl.
G06F 21/00 (2013.01)
H03K 3/037 (2006.01)
G06F 21/55 (2013.01)
H03K 19/003 (2006.01)

(52) U.S. Cl.
CPC ............ *H03K 3/0375* (2013.01); *G06F 21/554* (2013.01); *H03K 19/003* (2013.01)

(58) Field of Classification Search
USPC ............................... 726/22; 380/277; 712/229
See application file for complete search history.

(56) References Cited

U.S. PATENT DOCUMENTS

| 6,115,819 | A  | * | 9/2000 | Anderson ..................... 726/20 |
| 6,791,362 | B1 |   | 9/2004 | Carlson et al. |
| 7,571,477 | B2 | * | 8/2009 | Oh et al. ......................... 726/23 |
| 7,864,372 | B2 | * | 1/2011 | Shibuya et al. ................ 358/1.9 |
| 2004/0114765 | A1 | * | 6/2004 | Liardet et al. ................. 380/277 |
| 2005/0127971 | A1 |   | 6/2005 | Hoff |
| 2009/0313461 | A1 | * | 12/2009 | Klug ............................ 712/229 |

FOREIGN PATENT DOCUMENTS

EP 1 130 515 9/2001
WO WO 2008/027966 3/2008

* cited by examiner

*Primary Examiner* — Longbit Chai
(74) *Attorney, Agent, or Firm* — Cozen O'Connor

(57) ABSTRACT

Securing a storage element for a binary datum, control register and chip card. This element (60) for storing a binary datum (D) inputs a signal representative of said binary datum, said storage to be carried out when an enable signal (ENA) is at a first predetermined level, supplies an output signal (Q) the state whereof represents the datum stored in said storage element (10), and detects an attack aimed at said enable signal (ENA) or at a signal internal to said storage element.

11 Claims, 8 Drawing Sheets

SECURING A STORAGE ELEMENT FOR A BINARY DATUM, CONTROL REGISTER AND CHIP CARD

RELATED APPLICATIONS

This application claims the priority of French application Ser. No. 10/56759 filed Aug. 25, 2010, the content of which is hereby incorporated by reference.

FIELD OF THE INVENTION

The invention is related to the field of security of electronic devices. It applies in particular but without limitation to securing integrated circuit cards, also called chip cards.

BACKGROUND OF THE INVENTION

In known fashion, it is customary to store sensitive information, for example secret keys intended for use in cryptographic algorithms, for example DES or AES keys, in so-called "control" registers of a chip card.

These control registers consist of a plurality of storage elements, each able to store one binary element (bit).

These storage elements often consist of D flip-flops or DFFs, which will now be described.

FIG. 1 shows a state-of-the-art D flip-flop, or DFF.

Such a flip-flop is traditionally used as a synchronization element for a clock or as a storage element for a binary element (or bit).

A D flip-flop has two input terminals BD, BCLK, and two output terminals BQ, BQ\ capable of receiving and supplying respectively:

an input signal D;
a clock signal CLK;
an output signal Q; and
a signal Q\ which is the complement of the output signal Q.

Optionally, an additional input terminal can be provided for receiving a reinitialization signal RESET.

The operation of the D flip-flop is illustrated by the timing diagram of FIG. 2: the output signal Q takes on the value of the input signal D on each rising edge of the clock signal CLK, these rising edges being shown with dotted lines.

FIG. 3 shows the details of the D flip-flop of FIG. 1.

In known fashion, a D flip-flop is itself made up of two gates (also known as latches), to with a master latch PM and a slave latch PE.

Each of these gates PM, PE receives an input signal W, W' corresponding to the inverted clock signal CLK.

When the signal W is low, the master gate (or master latch) PM is said to be latched, each of the outputs Q' and Q'\ maintaining its value, whatever the value of the input signal D.

When the signal W goes high, the master gate (or master latch) PM is said to be unlatched, the output signals Q' and Q'\ taking on the value of the input signal D and its complement D\ respectively.

In the D flip-flop of FIG. 3, the presence of an intermediate signal Q' is noted at the output of the master gate PM, this signal being supplied to the input of the slave latch PE.

FIG. 4 illustrates the timing diagram of the D flip-flop including that of the intermediate signal Q'.

In such a flip-flop:

when the clock is low (coarse hatching), the master gate PM is unlatched and the slave latch PE is latched: the value of the intermediate signal Q' at the output of the master latch PM is equal to the value of the input signal D; and when the clock is high (fine hatching), the master gate PM is latched and the slave latch PE unlatched: the value of the output signal Q of the slave latch PE takes on the value of the intermediate signal Q'.

FIG. 5 illustrates in detail a gate (or latch) PM or PE in the form of logic functions, each reference 1 through 4 representing a NOT AND (NAND) logic function, it being recalled that such a logic function produces an output equal to 0 when both its inputs are equal to 1, and an output equal to 1 in the other three cases.

It will be noted in particular that the output signal Q is reinserted at the input to the logical NAND function 4 producing the signal Q\, and likewise, that the signal Q\ is reinserted at the input of the logical NAND function 3 which introduces a time lag between the commutation of the signals Q and Q\.

It will be explained later how the invention makes advantageous use of this time lag.

In known fashion, it is possible to use an additional enable signal ENA to control the edge at which the binary datum must be stored by the D flip-flop.

In practice, the enable signal ENA is provided by a state machine and synchronized with the clock signal CLK.

FIG. 6 illustrates this implementation, the clock signal CLK no longer being provided directly at the input terminal BCLK of the D flip-flop, the so-called "storage" signal MEM at the input of this terminal being the result of a logical AND between the clock signal CLK and the enable signal ENA itself.

In the remainder of this document we will call the input terminal of a logical AND function 8 receiving the enable signal ENA the "enable terminal" BENA, the output signal of this logic function 8, resulting from a logical AND between the enable signal ENA and the clock signal CLK, being supplied at the input of the BCLK terminal of the D flip-flop.

The timing diagram of FIG. 7 illustrates the example of storage of a binary element for a duration equal to one clock cycle, the value Q being stored at the time of the rising edge of the clock signal CLK only if the enable signal ENA is high.

The control registers can be subjected to attack by light pulse, such a pulse having the effect of forcing or altering the value of one or more bits of the control register subjected to said attack.

Conventionally, designers of integrated circuits seeking to protect against this kind of attack duplicate the control registers, later comparing them regularly (typically at every access), a discrepancy between the two registers being considered to be the result of an attack.

This solution is not satisfactory; the fact of duplicating the registers requires additional silicon area that is relatively costly.

SUMMARY OF THE INVENTION

One object of the invention is to provide mechanisms for securing control registers against external disturbances aimed either at the enable signal ENA or at one or more intermediate signals A, B, Q and Q\ of the two gates (or latches) that make up the D flip-flop.

One aspect of the invention relates to a storage element for a binary datum, this element comprising:

means for entering a signal representing the binary datum, the storage of the binary datum to be carried out when an enable signal is at a first predetermined level; and means for providing an output signal the state whereof represents the datum stored in the storage element.

This storage element is noteworthy in that it comprises means for detecting an attack aimed at the enable signal or at a signal internal to the storage element.

This aspect of the invention proposes to secure the storage elements of the registers rather than duplicate them.

The invention thus allows the optimization of silicon area, fewer logic gates being needed to provide protection against attacks.

In a preferred embodiment of the invention, the storage element supplies a signal when an attack is detected, this signal being taken into account in triggering a security action.

Different variations of the invention can be implemented.

In a first variation in implementation, the aim is to prevent an attack affecting the enable signal ENA and to prevent the storage of a datum in the storage element when such an attack occurs.

In a particular form of this first variation of implementation, the storage element according to the invention comprises, upstream of the terminal receiving the enable signal:
  means for generating a secure enable signal, this signal differing from the enable signal in that it takes on a second level different from the first level in the event of detection of an attack aimed at the enable signal; and
  means for supplying this secure enable signal to the input of the aforementioned terminal.

In one particular embodiment of the invention, a signal complementary to the enable signal itself is used to generate the secure enable signal, the secure enable signal being obtained by logical combination based on these two signals.

In other words, the enable signal is paired with its complement.

Thus, in a particular embodiment of the invention, the secure enable signal generation means comprise a gate capable of inverting the complement of the enable signal and a logic function capable of producing the secure enable signal by performing a logical AND between the enable signal and the aforementioned inverted signal.

Thus, if a disruption occurs on one or the other of these signals, they will become equal, and the logical AND function will maintain an inactive output.

An attacker can bypass this countermeasure by disrupting the output of this logical AND function and by forcing it high.

A second variation of implementation of the invention allows such an attack to be detected, by detecting the disruption of one or more of the intermediate signals A, B, Q and Q\.

In this second variation of the invention, the storage element according to the invention comprises:
  means for detecting commutation of the output signal; and
  means for detecting an attack if the enable signal is not in the first state at the time of the commutation.

The first and second variations can be used independently or in combination.

In a particular embodiment of this second variation in implementation, the storage element comprises means for generating a commutation signal one level whereof represents a commutation of the output signal from at least one first level to a second level.

Thus, according to an embodiment of the invention, it will be possible to detect:
  a commutation of the output signal from high to low;
  a commutation of the output signal from low to high; or
  any kind of commutation of the output signal.

For example, in one embodiment for which a signal complementary to the output signal is available, the means of generating the commutation signal comprise a first logic function capable of producing the commutation signal by performing a logical NOT AND between the output signal and its complementary signal.

Very advantageously, this first logic function produces a strong pulse when the output signal and its complementary signal are equal, which will not fail to occur when a commutation occurs, during a very brief period as will be demonstrated hereafter with supporting timing diagrams.

In another preferred embodiment of the invention, the means of generating the commutation signal comprise a pair of inverters capable of inverting the output signal and its complementary signal and a second logic function capable of producing the commutation signal by performing a NOT AND logic function between the aforementioned inverted signals.

The second variation of implementation of the invention allows detection of an attack aimed at an internal signal of the storage element.

It was previously stated that the first variation of implementation of the invention allowed detection of an attack on the enable signal.

Both variations can be combined to great advantage.

An embodiment of the invention includes a storage element comprising means for generating a pulse if the secure enable signal is at the second level at the time that a commutation of the output signal is detected.

This embodiment is particularly robust.

In a particular embodiment of the invention, the aforementioned pulse persists only during the time period during which the output signal and its complementary signal have the same value.

One embodiment of the invention extends the duration of this pulse so that it can be taken into account by other logic.

Another aspect of the invention includes a control register comprising one or more storage elements like that mentioned above.

Another aspect of the invention includes a microcircuit card comprising at least one control register like that mentioned above.

DETAILED DESCRIPTION OF THE DRAWINGS

Figure 8:
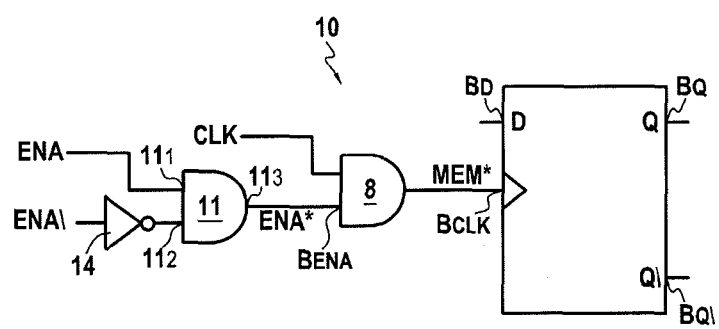
FIGS. 8, 9, 11, 12, 13 and 14 show storage elements in conformity with different embodiments of the invention.

FIG. 8 shows a storage element 10 conforming to a first embodiment of the invention, this storage element being capable of preventing an attack aimed at the enable signal ENA and of preventing the storage of a datum D in the event that such is detected.

Figure 6:
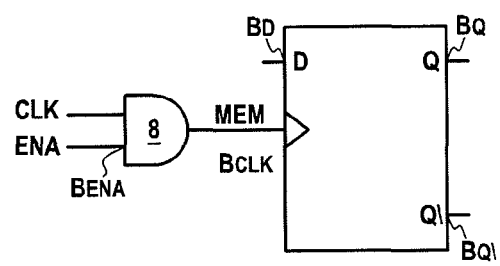
FIG. 6 shows the D flip-flop of FIG. 1 modified to allow control of the storage of binary information.
Figure 7:
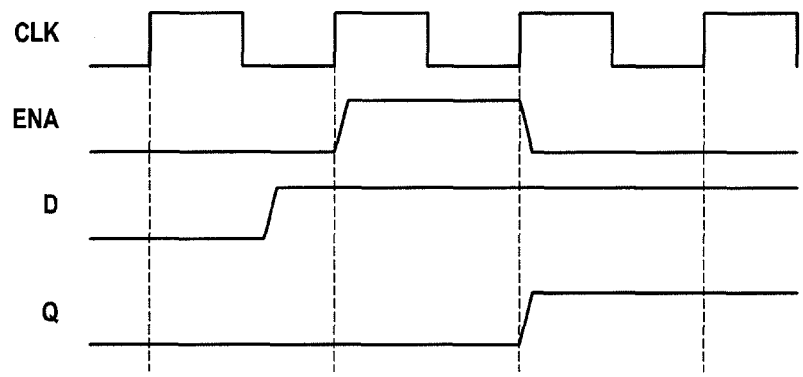
FIG. 7 shows a timing diagram of the flip-flop of FIG. 6.

In the implementation example described here, this storage element 10 comprises a logical AND function 11 capable of receiving the enable signal at a first input terminal 11, and the inverse signal of the complement ENA\ at a second input terminal 112, the secure enable signal ENA* at the output 113 of this logic function 11 being supplied at the input of the enable terminal BENA of the logic function 8 already described with reference to FIG. 6.

Consequently, if a disturbance affects one or the other of the signals ENA or ENA\, these signals become equal and the secure enable signal ENA* is in the low or 0 state.

Of course, if no attack affects the enable signal ENA or its complement ENA\, the secure enable signal ENA* is equivalent to the enable signal ENA itself.

MEM* is the name given to the secure storage signal resulting from the logical AND (carried out by the logic gate 8) between the clock signal CLK and the secure enable signal ENA*.

This secure storage signal MEM* is supplied at the input of the terminal BCLK of the storage element 10.

In the arrangement of FIG. 8, the storage element 10 is able to store a datum D on the rising edges of the clock signal CLK only if firstly the enable signal ENA is high and if secondly neither the enable signal ENA nor its complement ENA\ is subject to a disturbance.

It will be noted that in practice, if an attack were to physically and simultaneously disturb the enable signal ENA and its complement ENA\, it is very probable that these two signals would take on the same value "0" or "1" (because the physical effect would be the same): this attack would consequently be ineffective.

Figure 9:
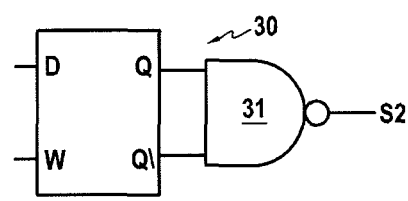

FIG. 9 illustrates another storage element 30 conforming to another embodiment of the invention.

This storage element is noteworthy in that it comprises means for generating a commutation signal S2 one state whereof represents a commutation of the output signal Q from low to high.

In the implementation example described here, this commutation signal S2 is obtained by performing a logical NOT AND (gate 31) between the output signal Q and its complementary signal Q\.

Figure 1:
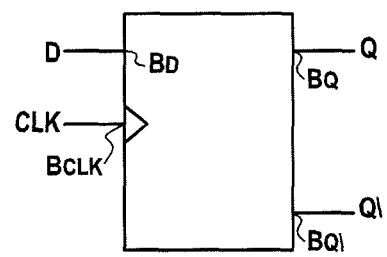
FIGS. 1 and 2 show a prior art D flip-flop and its timing diagram.
Figure 2:
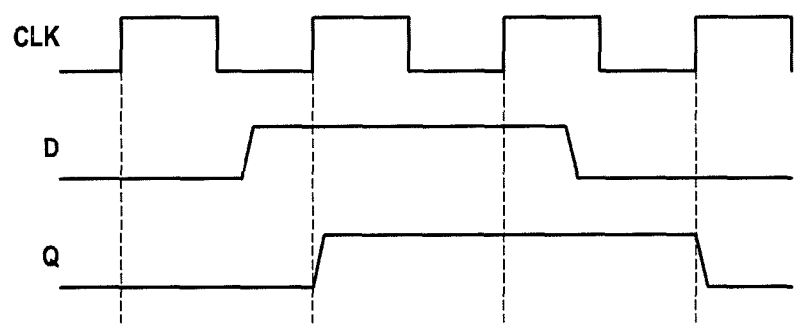
Figure 3:
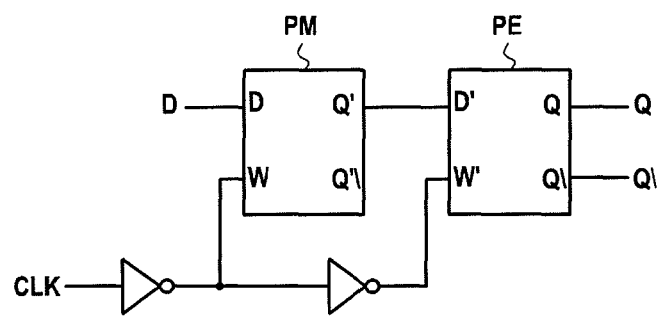
FIGS. 3 and 4 show the details of the D flip-flop of FIG. 1 and a timing diagram of this D flip-flop revealing an intermediate signal.
Figure 4:
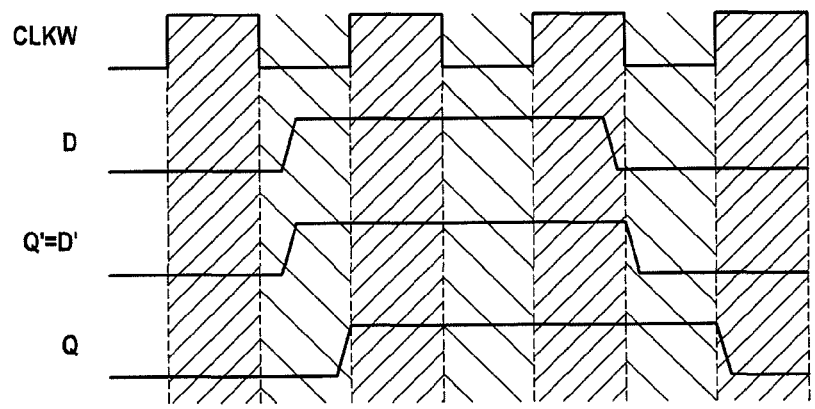
Figure 5:
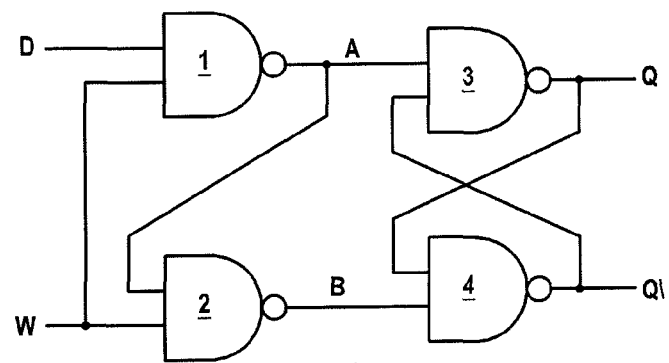
FIG. 5 shows a prior art gate (or latch) in the form of logic functions.

This embodiment makes advantageous use of the time lag between the commutation of the signal Q and that of the complementary signal Q\, this time lag being due to the very structure of the storage element as already described with reference to FIG. 5.

Figure 10:
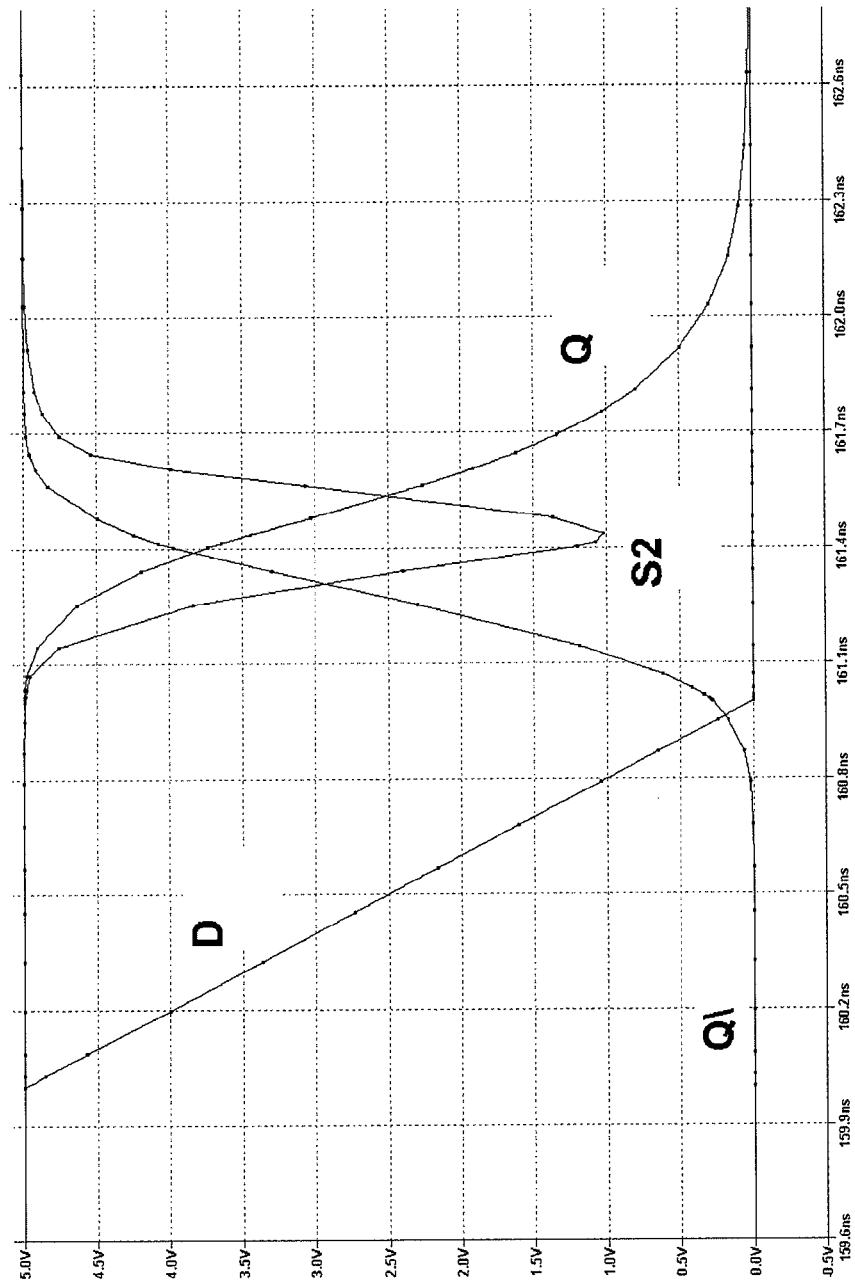
FIG. 10 illustrates a time lag within the storage element of FIG. 9 when a commutation takes place.

FIG. 10 illustrates this lag for one case where the signal W is forced to 1 (gate/latch unlatched) with commutation of the input signal Q.

In this figure are shown:
the input signal D;
the output signal Q;
the complementary signal Q\; and
the commutation signal S2 resulting from the NOT AND logic function between the complementary signals Q and Q\.

In the example of this FIG. 10, it is observed that the complementary signal Q\ commutes before the output signal Q and that the commutation signal S2 goes low (logic state 0) during this time period, the two outputs Q and Q\ being at the same high level (logic state 1) during this time period.

Figure 11:
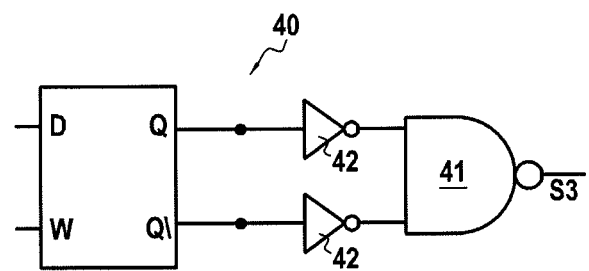

FIG. 11 shows a storage element 40 conforming to another embodiment of the invention, this storage element being noteworthy in that it comprises means for generating a commutation signal S3 one state whereof represents a commutation of the output signal Q from high to low.

When such a commutation occurs, the signals Q and Q\ are both in the low state for a brief period.

In the example of FIG. 11, the means of the storage element 40 for detecting this commutation consist of a pair of inverting gates 42 capable of inverting the signals Q and Q\ and by a logic function 41 capable of producing the commutation signal S3 by performing the logical NOT AND between said inverted signals.

Figure 12:
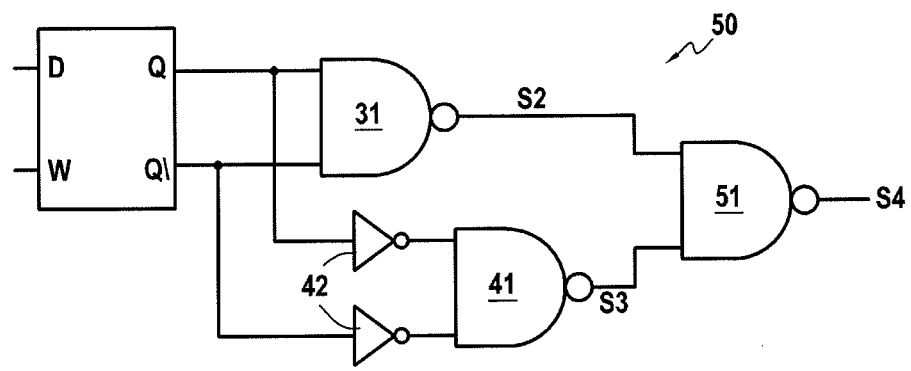

FIG. 12 shows a storage element 50 conforming to the invention capable of producing a commutation signal S4 upon commutation of the output signal Q from high to low or from low to high.

This storage element is obtained by combining the embodiments of FIGS. 10 and 11, the outputs S2 and S3 of the logic gates 31 and 32 being supplied at the input of a logic function 51 capable of producing a commutation signal S4 by performing the logical NOT AND between the signals S2 and S3.

It has been explained above how the storage elements 30, 40 and 50 of FIGS. 9, 11 and 12 were able to detect commutation of the output signal Q.

In a particular embodiment of the invention that can be applied to any of the storage elements 30, 40 and 50, the commutation is checked to determine whether it was intended or due to an attack.

For that, the invention proposes to check the state of the enable signal ENA at the time when the commutation is detected.

In a preferred embodiment combining the two variations of the invention, it is not the state of the enable signal ENA itself that is of interest, but rather the state of the secure validation signal ENA*.

Figure 13:
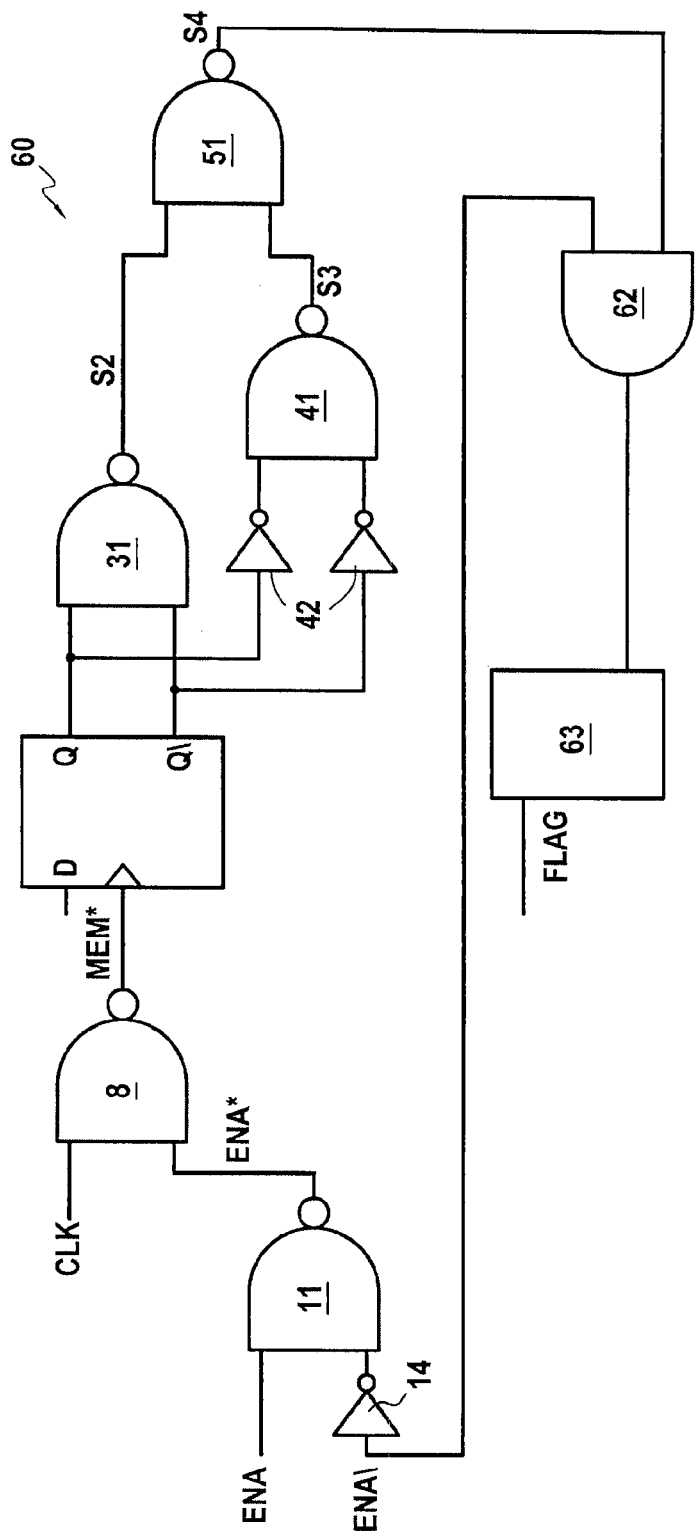

FIG. 13 shows a storage element 60 conforming to this embodiment. It is obtained from the storage element 10 of FIG. 8 and from the storage element 50 of FIG. 12.

More precisely, in the embodiment described here, the storage element 60 comprises an AND gate 62 taking as input the enable signal ENA and the commutation signal S4.

Thus, an output pulse from the AND gate 62 indicating a commutation of the output Q of the storage element 60 will be taken into account only if the enable signal ENA is active.

In the case of a deceptive commutation (by disrupting ENA* or intermediate signals of the D flip-flop), the pulse goes to the output of the AND gate 62 (the ENA\ signal not being affected in this case, it is high and allows the pulse to pass the gate 62), these being connected to the SET input of a synchronous RS flip-flop 63.

The FLAG output of the RS flip-flop allows detection of the deception and initiation of a security action.

In the case of a disruption of the signals ENA or ENA\, ENA* remains inactive, therefore Q and Q\ are not changed. Such an attack is not detected because it does not raise the FLAG; this is not objectionable, however, the register having maintained its value.

Figure 14:
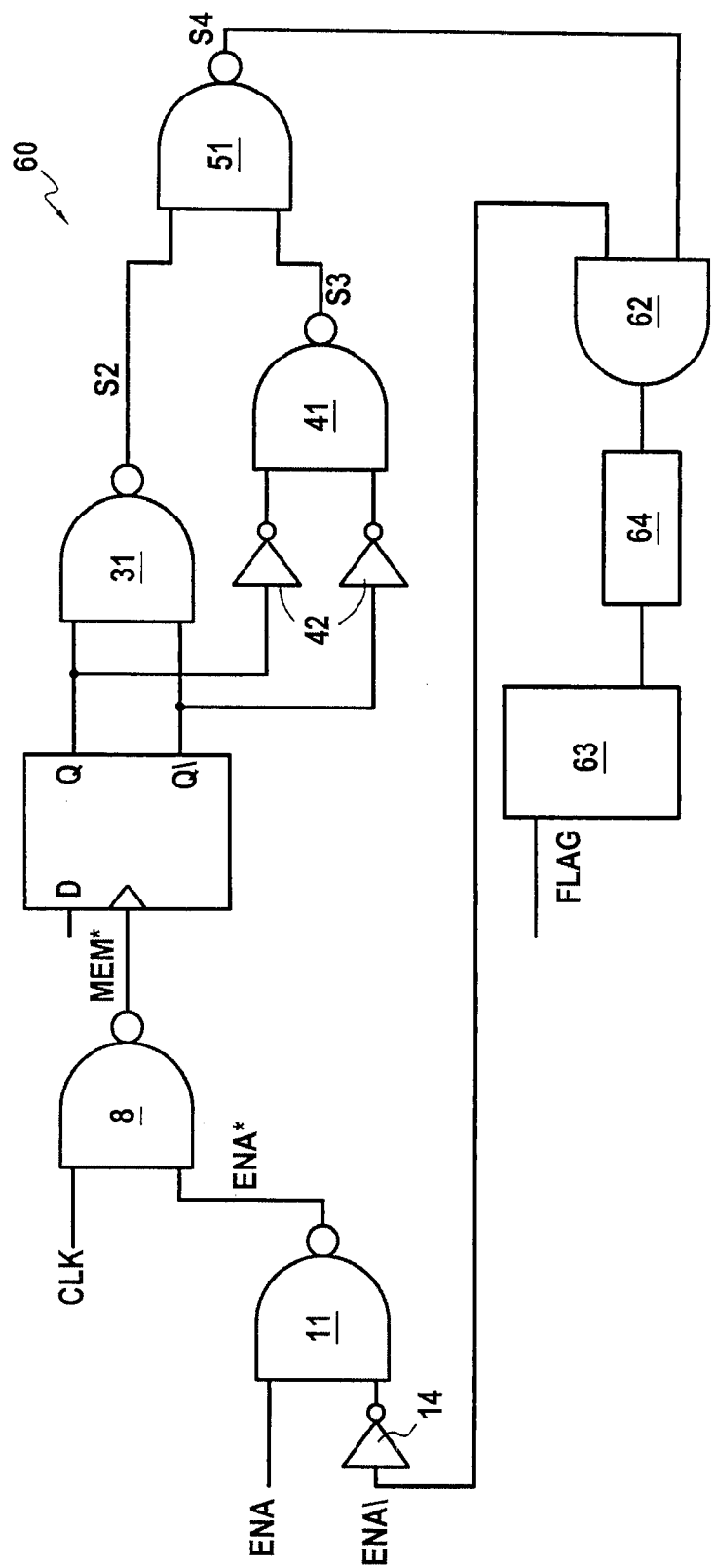

In the implementation example of FIG. 14, the storage element 60 also comprises a device 64 for extending the duration of the output pulse from the AND gate 62.

Figure 15:
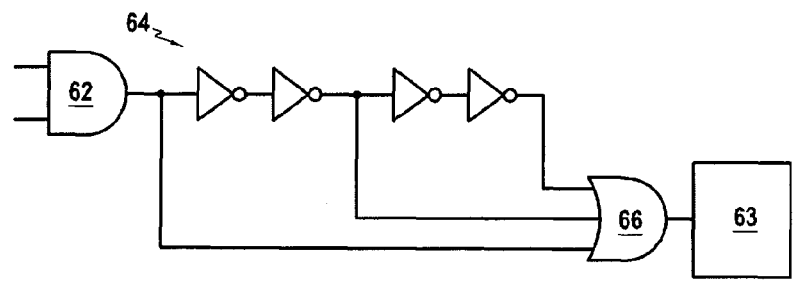
FIG. 15 shows a mechanism that can be used in a storage element according to an embodiment of the invention to extend the duration of a pulse.

This device 64 shown in FIG. 15 comprises a series of an even number of inverting gates, each allowing a delay to be added to the output signal of the logic gate 62 and an OR gate 66 capable of supplying, at the input of the RS flip-flop 63, a pulse of extended duration.

The description given previously with reference to FIGS. 8 through 15 makes it possible to secure a storage element against attacks aimed at the enable signal or a signal internal to said element.

The invention can be applied to store several storage elements of a control register, in a microcircuit card for example. In this case, certain logical elements may be factored: (gate 61, device 64) in order to optimize the area of the device.

Figure 16:
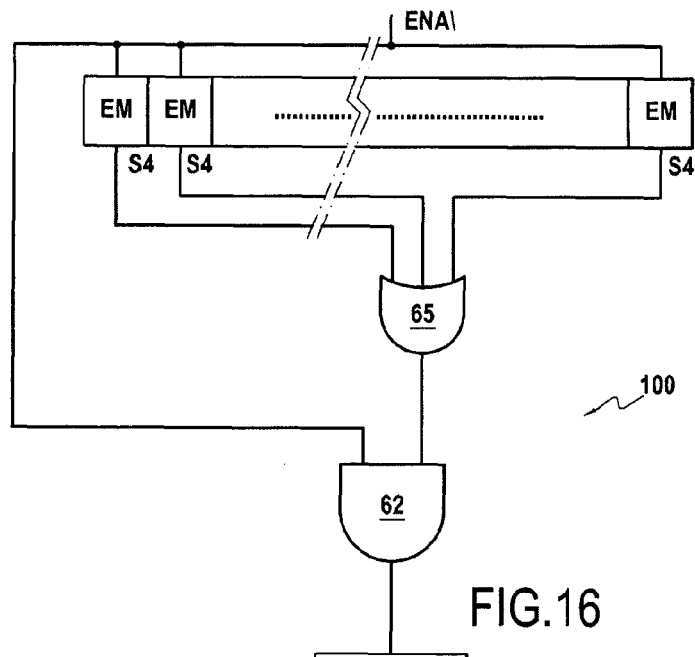
FIG. 16 shows a control register conforming to a particular embodiment of the invention.

FIG. 16 shows a control register conforming to the invention comprising several storage elements EM conforming to the invention, each of the storage elements EM being allowed to conform to one of those described with reference to FIG. 8, 9, 11, 12, 13 or 14.

Figure 17:
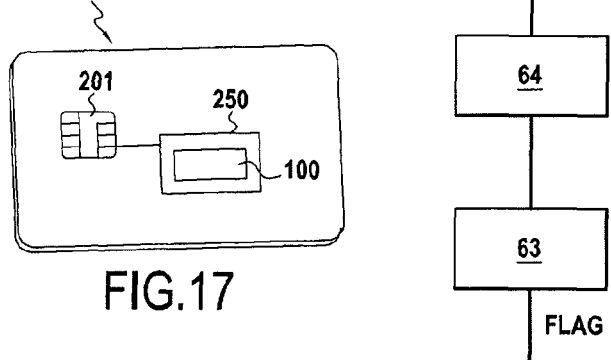
FIG. 17 shows a microcircuit card conforming to an embodiment of the invention.

FIG. 17 shows a microcircuit card 200 conforming to this invention.

In this embodiment, the microcircuit card 200 complies with the ISO 7816 standard. It comprises in particular an array of contacts 201 and a microcontroller 250.

Said microcontroller 250 comprises a register 100 conforming to the invention of the same type as that of FIG. 16, wherein a secret key is stored.

The invention claimed is:

1. A device of storage element configured to store a single binary datum, the storage element comprising:
   a flip-flop formed by a plurality of logic gates, the flip-flop being configured to store the single binary datum;
   means for inputting an enable signal to the flip-flop;
   means for generating a secure enable signal;
   means for inputting a signal representative of said binary datum to the flip-flop, said storage to be performed by the flip-flop when the enable signal is at a first predetermined level;
   means for supplying an output signal from the storage element, the state of the output signal representing whereof represents the datum stored in said flip-flop;
   means for detecting commutation of the output signal; and
   means for detecting an attack directly against said enable signal or an intermediate signal internal to said storage element so as to prevent the storage of a datum in the storage element upon detecting attack.

2. The storage element according to claim 1, comprising a terminal configured to receive said enable signal, and comprising upstream of said terminal:
   means for generating a secure enable signal different from said enable signal in that it takes on a second level that is different from said first level in the event of detection of an attack aimed at said enable signal; and
   means for supplying said secure enable signal as input to said terminal.

3. The storage element according to claim 2, wherein said means of generation comprise a gate configured to invert a complementary signal of said enable signal and a logic function configured to produce said secure enable signal by performing a logical AND between said enable signal and said inverted signal.

4. The storage element according to claim 2, comprising means for generating a pulse if said secure enable signal is at said second level at a time that said commutation is detected.

5. The storage element according to claim 4, comprising means for extending the duration of said pulse.

6. The storage element according to claim 1, comprising:
   means for detecting commutation of said output signal; and
   means for detecting an attack if said enable signal is not at said first level at a time of detecting of said commutation.

7. The storage element according to claim 6, comprising means for generating a commutation signal, one level of the commutation signal representing a commutation of said output signal from at least one first output signal level to a second output signal level.

8. The storage element according to claim 7, comprising a second output for a complementary signal of said output signal and wherein said means of generating the commutation signal comprise a first logic function configured to produce said commutation signal by performing a logical NOT AND between said output signal and its complementary signal.

9. The storage element according to claim 7, wherein said means for generating the commutation signal comprise:
   a pair of inverters configured to invert said output signal and its complementary signal, respectively; and
   a second logic function configured to produce said commutation signal by performing a logical NOT AND between said inverted signals.

10. A control register comprising at least one storage element according to claim 1.

11. A microcircuit card comprising at least one control register according to claim 10.

* * * * *